United States Patent
Taneike et al.

(10) Patent No.: US 11,458,537 B2
(45) Date of Patent: Oct. 4, 2022

(54) HEAT TREATMENT METHOD FOR ADDITIVE MANUFACTURED NI-BASE ALLOY OBJECT, METHOD FOR MANUFACTURING ADDITIVE MANUFACTURED NI-BASE ALLOY OBJECT, NI-BASE ALLOY POWDER FOR ADDITIVE MANUFACTURED OBJECT, AND ADDITIVE MANUFACTURED NI-BASE ALLOY OBJECT

(71) Applicant: MITSUBISHI HEAVY INDUSTRIES, LTD., Tokyo (JP)

(72) Inventors: Masaki Taneike, Tokyo (JP); Kosuke Fujiwara, Tokyo (JP); Hidetaka Haraguchi, Tokyo (JP); Shuji Tanigawa, Tokyo (JP); Nobuhiko Saito, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 230 days.

(21) Appl. No.: 16/495,949

(22) PCT Filed: Mar. 26, 2018

(86) PCT No.: PCT/JP2018/011982
§ 371 (c)(1),
(2) Date: Sep. 20, 2019

(87) PCT Pub. No.: WO2018/181098
PCT Pub. Date: Oct. 4, 2018

(65) Prior Publication Data
US 2020/0094325 A1  Mar. 26, 2020

(30) Foreign Application Priority Data
Mar. 29, 2017 (JP) .............................. JP2017-064847

(51) Int. Cl.
*B22F 3/24* (2006.01)
*C22C 1/04* (2006.01)
(Continued)

(52) U.S. Cl.
CPC .............. *B22F 3/24* (2013.01); *C22C 1/0433* (2013.01); *C22C 19/051* (2013.01); *C22F 1/10* (2013.01);
(Continued)

(58) Field of Classification Search
CPC ..... B33Y 10/00; C22C 19/051; C22C 19/056; C22C 19/055
See application file for complete search history.

(56) References Cited

U.S. PATENT DOCUMENTS

| 4,047,933 | A | | 9/1977 | Larson et al. |
| 4,253,884 | A | * | 3/1981 | Maurer ..................... C22F 1/10 148/527 |

(Continued)

FOREIGN PATENT DOCUMENTS

| CN | 1339070 | 3/2002 |
| CN | 1492065 | 4/2004 |

(Continued)

OTHER PUBLICATIONS

CN104975204 machine translation (Year: 2015).*
(Continued)

*Primary Examiner* — Paul A Wartalowicz
*Assistant Examiner* — Stephani Hill
(74) *Attorney, Agent, or Firm* — Wenderoth, Lind & Ponack, L.L.P.

(57) ABSTRACT

A heat treatment method for an additive manufactured object formed of a laminate-molded Ni-base alloy includes: a heat treatment step for carbide precipitation optimization of heating the additive manufactured object for 1 hour or
(Continued)

longer and 100 hours or shorter at a temperature which is equal to or higher than a temperature T1 determined by Formula (1) according to amounts of component elements and is equal to or lower than 1,350° C.; and an aging treatment step of heating the additive manufactured object for 1 to 30 hours at a temperature of 800° C. to 950° C. after the heat treatment step for carbide precipitation optimization.

$$T1 \; (°C.) = 177 \times Ni\,(\%) + 176 \times Co\,(\%) + 172 \times Cr\,(\%) + 178 \times Mo\,(\%) + 174 \times W\,(\%) + 171 \times Al\,(\%) + 170 \times Ti\,(\%) + 168 \times Ta\,(\%) + 163 \times Nb\,(\%) + 307 \times C\,(\%) - 16259 \quad (1)$$

9 Claims, 4 Drawing Sheets

(51) Int. Cl.
  *C22C 19/05* (2006.01)
  *C22F 1/10* (2006.01)
  *B33Y 10/00* (2015.01)
  *B33Y 70/00* (2020.01)
  *B33Y 80/00* (2015.01)

(52) U.S. Cl.
  CPC ..... *B22F 2003/248* (2013.01); *B22F 2301/15* (2013.01); *B33Y 10/00* (2014.12); *B33Y 70/00* (2014.12); *B33Y 80/00* (2014.12)

(56) References Cited

U.S. PATENT DOCUMENTS

| | | | | |
|---|---|---|---|---|
| 4,767,493 | A * | 8/1988 | Mino | C22F 1/10 117/10 |
| 5,523,170 | A * | 6/1996 | Budinger | B23K 35/0244 419/54 |
| 5,820,700 | A * | 10/1998 | DeLuca | C22C 19/057 148/410 |
| 6,129,795 | A * | 10/2000 | Lehockey | C22F 1/10 148/624 |
| 6,478,897 | B1 | 11/2002 | Izumida et al. | |
| 2004/0022661 | A1 | 2/2004 | Wood et al. | |
| 2004/0076540 | A1 | 4/2004 | Imano et al. | |
| 2010/0310411 | A1 | 12/2010 | Ohsaki et al. | |
| 2012/0100030 | A1 * | 4/2012 | Green | B22F 7/02 419/6 |
| 2012/0141293 | A1 | 6/2012 | Sato et al. | |
| 2012/0273468 | A1 | 11/2012 | Arjakine et al. | |
| 2013/0263977 | A1 | 10/2013 | Rickenbacher et al. | |
| 2016/0082511 | A1 | 3/2016 | Cui et al. | |
| 2016/0177424 | A1 * | 6/2016 | Seo | C21D 1/18 148/555 |
| 2016/0273079 | A1 * | 9/2016 | Das | B22F 5/04 |
| 2016/0279734 | A1 | 9/2016 | Schick et al. | |
| 2017/0022586 | A1 * | 1/2017 | Hardy | C22C 19/058 |
| 2017/0291220 | A1 | 10/2017 | Nakamura et al. | |
| 2018/0002785 | A1 * | 1/2018 | Dial | C22C 19/057 |
| 2018/0161934 | A1 * | 6/2018 | Boswell | C22F 1/10 |
| 2021/0130932 | A1 * | 5/2021 | Goncharov | C22C 19/055 |

FOREIGN PATENT DOCUMENTS

| | | | | |
|---|---|---|---|---|
| CN | 101946015 | | 1/2011 | |
| CN | 104561662 | | 4/2015 | |
| CN | 104975204 | A * | 10/2015 | |
| DE | 27 24 640 | | 12/1977 | |
| DE | 603 09 266 | | 5/2007 | |
| DE | 10 2009 051 823 | | 5/2011 | |
| EP | 1195446 | A1 * | 4/2002 | ............... B22F 3/24 |
| EP | 3 332 892 | | 6/2018 | |
| GB | 2 153 845 | | 8/1985 | |
| GB | 2153845 | A * | 8/1985 | ........... C22C 1/0433 |
| GB | 2506494 | A * | 4/2014 | ............. B22F 10/20 |
| JP | 2012-117122 | | 6/2012 | |
| JP | 2013-510000 | | 3/2013 | |
| JP | 5840593 | | 1/2016 | |
| JP | 2016-029217 | | 3/2016 | |
| JP | 2016-060967 | | 4/2016 | |
| JP | 2016-196702 | | 11/2016 | |
| JP | 2017-186620 | | 10/2017 | |
| JP | 2018-150615 | | 9/2018 | |
| JP | 2019-044209 | | 3/2019 | |
| WO | 2014/126086 | | 8/2014 | |

OTHER PUBLICATIONS

International Search Report dated May 15, 2018 in International (PCT) Application No. PCT/JP2018/011982 with English translation.

Written Opinion of the International Searching Authority dated May 15, 2018 in International (PCT) Application No. PCT/JP2018/011982 with English translation.

* cited by examiner

COMPARATIVE EXAMPLE (CONVENTIONAL MATERIAL)

\* WHITE PRECIPITATES ARE MC
BLACK PRECIPITATES ARE $M_{23}C_6$

INVENTION EXAMPLE
ONE OR MORE $M_{23}C_6$ CARBIDES ARE PRECIPITATED PER 10 μm OF GRAIN BOUNDARY LENGTH

FIG. 6
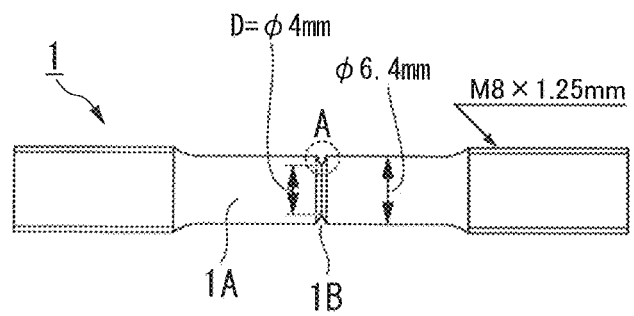
FIG. 7   DETAILED VIEW OF "A" PART
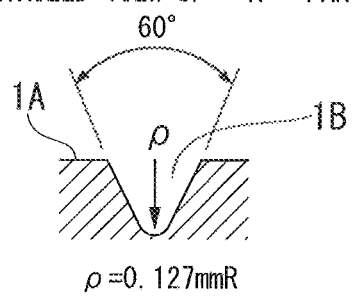
FIG. 8
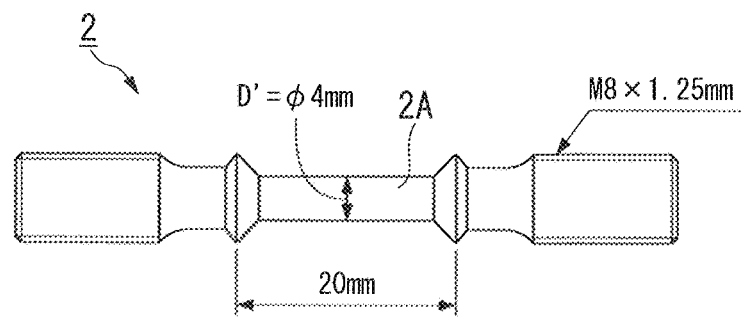

HEAT TREATMENT METHOD FOR ADDITIVE MANUFACTURED NI-BASE ALLOY OBJECT, METHOD FOR MANUFACTURING ADDITIVE MANUFACTURED NI-BASE ALLOY OBJECT, NI-BASE ALLOY POWDER FOR ADDITIVE MANUFACTURED OBJECT, AND ADDITIVE MANUFACTURED NI-BASE ALLOY OBJECT

TECHNICAL FIELD

The present invention relates to a heat treatment method for an additive manufactured Ni-base alloy object, a method for manufacturing an additive manufactured Ni-base alloy object, a Ni-base alloy powder for an additive manufactured object, and an additive manufactured Ni-base alloy object.

Priority is claimed on Japanese Patent Application No. 2017-064847, filed on Mar. 29, 2017, the content of which is incorporated herein by reference.

BACKGROUND ART

In recent years, metal additive manufacturing techniques have been developed and put to practical use among so-called 3D printer (three-dimensional modeling) technologies. In this type of metal additive manufacturing method, a metal powder layer that serves as a raw material of a metallic shaped object that becomes a product is disposed on a base plate, and a predetermined region on the metal powder layer is irradiated with high-density energy such as a laser. Then, the metal powder in the region is rapidly melted, rapidly cooled, and solidified to form a metal solidified layer having a predetermined shape. By repeating such a process, a three-dimensionally shaped laminate is formed.

Ni-base alloys containing Ni as a main component have been known to have high heat resisting properties and a high high-temperature strength, and members made of a Ni-base alloy through a casting method have been widely used for heat resisting members such as turbine members for a gas turbine which require a high-temperature strength.

Attempts have recently been made to apply a metal additive manufacturing method capable of performing shaping in series without complicated manufacturing steps as a method for manufacturing a component made of a Ni-base alloy with a complicated shape such as a component having an internal cooling passage (for example, PTL 1).

CITATION LIST

Patent Literature

[PTL 1] Japanese Patent No. 5840593

DISCLOSURE OF INVENTION

Technical Problem

Even in a case where a heat resisting member made of a Ni-base alloy is manufactured by a metal additive manufacturing method, a long high temperature creep life is preferable.

Particularly, turbine components and the like which are actually used have complicated shapes and many irregularities or notch parts in their surfaces, and thus the members do not always have smooth surfaces in many cases. In that case, it is desirable for members with complicated shapes or members with many irregularities which are actually used to have a long high temperature creep life (notch high temperature creep life) in a high temperature creep rupture test which is performed using a notch test piece.

The invention has been contrived in view of the above circumstances, and an object of the invention is to provide a heat treatment method for obtaining an additive manufactured Ni-base object, which is capable of improving a notch high temperature creep life, a method for manufacturing an additive manufactured Ni-base alloy object, a Ni-base alloy powder for an additive manufactured object, and an additive manufactured Ni-base alloy object.

Solution to Problem

The inventors of the invention have repeatedly conducted intensive experiments and studies to find means for significantly extending the notch high temperature creep life by causing notch strengthening in a heat resisting Ni-base alloy member obtained by an additive manufacturing method, and found that in a case where a heat treatment is appropriately performed on the additive manufactured object according to a composition of the Ni-base alloy, notch weakening is turned into notch strengthening, and thus the notch high temperature creep life can be significantly extended.

Specifically, according to a first aspect of the invention, there is provided a heat treatment method for an additive manufactured Ni-base alloy object which is performed on an additive manufactured object formed of a Ni-base alloy laminate-molded into a predetermined shape, having: a heat treatment step for carbide precipitation optimization of heating the additive manufactured object for 0.5 hours or longer and 100 hours or shorter at a temperature which is equal to or higher than a temperature T1 determined by Formula (1) according to contents (mass %) of component elements of the Ni-base alloy and is equal to or lower than 1,350° C.; and an aging heat treatment step of heating the additive manufactured object for 1 to 30 hours at a temperature of 800° C. to 950° C. after the heat treatment step for carbide precipitation optimization.

$$T1\ (°\ C.) = 177 \times Ni\ (\%) + 176 \times Co\ (\%) + 172 \times Cr\ (\%) + 178 \times Mo\ (\%) + 174 \times W\ (\%) + 171 \times Al\ (\%) + 170 \times Ti\ (\%) + 168 \times Ta\ (\%) + 163 \times Nb\ (\%) + 307 \times C\ (\%) - 16259 \tag{1}$$

According to a second aspect of the invention, in the heat treatment method for an additive manufactured Ni-base alloy object of the first aspect, the Ni-base alloy contains, by mass %, Co: 15% to 25%, Cr: 10% to 25%, Mo: 0% to 3.5%, W: 0.5% to 10%, Al: 1.0% to 4.0%, Ti: 0% to 5.0%, Ta: 0% to 4.0%, Nb: 0% to 2.0%, C: 0.03% to 0.2%, B: 0.001% to 0.02%, Zr: 0% to 0.1%, and a balance consisting of Ni and unavoidable impurities, Al (%)+0.5×Ti (%) is 1% to 5%, and W (%)+0.5×Mo (%) is 0.5% to 10%.

According to a third aspect of the invention, in the heat treatment method for an additive manufactured Ni-base alloy object of the second aspect, a total content of Ti, Ta, and Nb in the Ni-base alloy is 10.0% or less by mass %.

According to a fourth aspect of the invention, the heat treatment method for an additive manufactured Ni-base alloy object of any one of the first to third aspects further includes a solution heat treatment step of heating the additive manufactured object for 0.5 to 10 hours at a temperature of 1,150° C. to 1,250° C. between the heat treatment step for carbide precipitation optimization and the aging heat treatment step.

According to a fifth aspect of the invention, in the heat treatment method for an additive manufactured Ni-base alloy object of any one of the first to fourth aspects, a heat treatment for stress removal is performed on the additive manufactured object before the heat treatment step for carbide precipitation optimization.

According to a sixth aspect of the invention, in the heat treatment method for an additive manufactured Ni-base alloy object of any one of the first to fifth aspects, a HIP treatment is performed on the additive manufactured object after the heat treatment step for carbide precipitation optimization and before the aging heat treatment step.

According to a seventh aspect of the invention, in the heat treatment method for an additive manufactured Ni-base alloy object of any one of the first to sixth aspects, a stabilization heat treatment is performed after the heat treatment step for carbide precipitation optimization and before the aging heat treatment step.

According to an eighth aspect of the invention, there is provided a heat treatment method for an additive manufactured Ni-base alloy object, in which one or more $M_{23}C_6$ carbides are precipitated on average at grain boundaries per 10 μm of grain boundary length by the heat treatment method for an additive manufactured Ni-base alloy object according to any one of the first to seventh aspects.

According to a ninth aspect of the invention, there is provided a method for manufacturing an additive manufactured Ni-base alloy object, having: an additive manufacturing step of forming an additive manufactured object formed of a Ni-base alloy on a substrate by repeating a process of melting a Ni-base alloy powder and forming a rapidly solidified layer on the substrate; and subsequently subjecting the additive manufactured object to the heat treatment method for an additive manufactured Ni-base alloy object according to any one of the first to seventh aspects.

According to a tenth aspect of the invention, in the method for manufacturing an additive manufactured Ni-base alloy object of the ninth aspect, an additive manufactured Ni-base alloy object in which one or more $M_{23}C_6$ carbides are precipitated on average at grain boundaries per 10 μm of grain boundary length is obtained.

According to an eleventh aspect of the invention, there is provided a Ni-base alloy powder for an additive manufactured object containing, by mass %: Co: 15% to 25%; Cr: 10% to 25%; Mo: 0% to 3.5%; W: 0.5% to 10%; Al: 1.0% to 4.0%; Ti: 0% to 5.0%; Ta: 0% to 4.0%; Nb: 0% to 2.0%; C: 0.03% to 0.2%; B: 0.001% to 0.02%; Zr: 0% to 0.1%; and a balance consisting of Ni and unavoidable impurities, in which Al (%)+0.5×Ti (%) is 1% to 5%, W (%)+0.5×Mo (%) is 0.5% to 10%, and an average grain size is 100 μm or less.

According to a twelfth aspect of the invention, the Ni-base alloy powder for an additive manufactured object of the eleventh aspect contains, by mass %: Co: 17% to 22%; Cr: 15% to 22%; Mo: 0% to 2%; W: 4% to 8%; Al: 1.5% to 3.5%; Ti: 1.0% to 4.0%; Ta: 0% to 3.0%; Nb: 0% to 1.5%; C: 0.06% to 0.15%; B: 0.001% to 0.01%; and Zr: 0% to 0.04%.

According to a thirteenth aspect of the invention, the Ni-base alloy powder for an additive manufactured object of the eleventh or twelfth aspect contains, by mass %, one or both of Ta: 0.01% to 3.0% and Nb: 0.01% to 1.5%.

According to a fourteenth aspect of the invention, in the Ni-base alloy powder for an additive manufactured object of any one of the eleventh to thirteenth aspects, the average grain size is 10 μm to 45 μm.

According to a fifteenth aspect of the invention, there is provided an additive manufactured Ni-base alloy object including: the Ni-base alloy having the composition according to any one of the eleventh to thirteenth aspects, in which one or more $M_{23}C_6$ carbides are precipitated on average at grain boundaries per 10 μm of grain boundary length.

Advantageous Effects of Invention

According to a heat treatment method for obtaining an additive manufactured Ni-base object, a method for manufacturing an additive manufactured Ni-base alloy object, a Ni-base alloy powder for an additive manufactured object, and an additive manufactured Ni-base alloy object of the invention, it is possible to improve a notch high temperature creep life.

BRIEF DESCRIPTION OF DRAWINGS

FIG. 6 is a plan view showing a notch test piece for a high temperature creep rupture test.

FIG. 7 is an enlarged cross-sectional view of a major part, showing a notch part of the notch test piece shown in FIG. 6.

FIG. 8 is a plan view showing a smooth test piece for a high temperature creep rupture test.

BEST MODE FOR CARRYING OUT THE INVENTION

Figure 1:
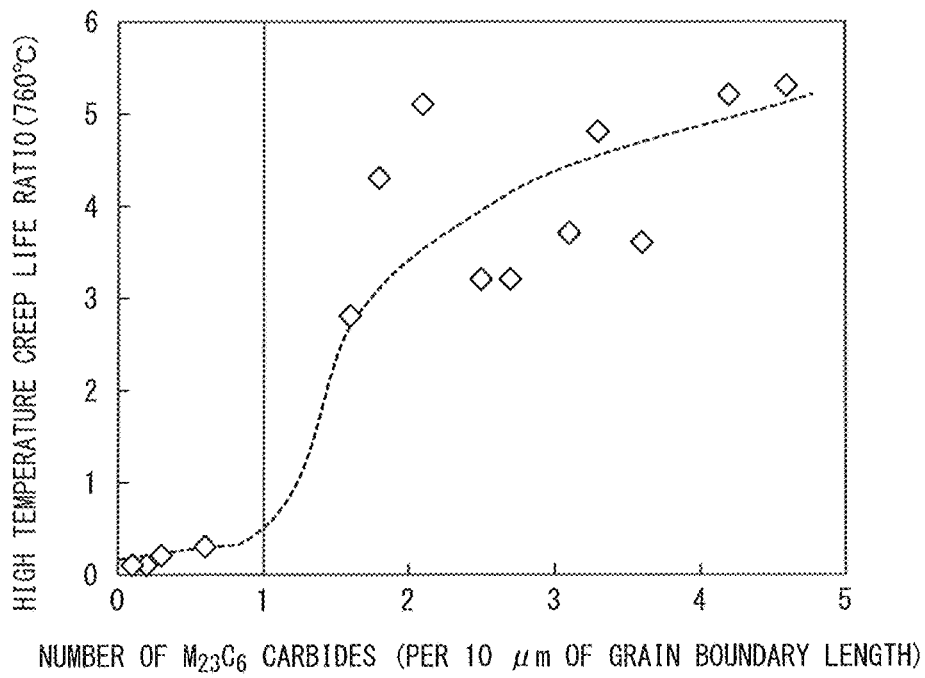
FIG. 1 is a graph showing a relationship between an average number of $M_{23}C_6$ carbides per 10 μm of grain boundary length in an additive manufactured Ni-base object and a creep life ratio obtained by a high temperature creep test at 760° C.

Hereinafter, embodiments of a heat treatment method for an additive manufactured Ni-base alloy object, a method for manufacturing an additive manufactured Ni-base alloy object, a Ni-base alloy powder for an additive manufactured object, and an additive manufactured Ni-base alloy object according to the invention will be described in detail.

<Experiments and Findings>

First, experiments performed by the inventors of the invention and findings obtained from the tests will be described.

In a heat resisting Ni-base alloy, a high-temperature strength is exhibited by a precipitation strengthening effect due to the precipitation of an intermetallic compound phase called a γ' phase However, in a case where the heat resisting Ni-base alloy is solidified or heat-treated, not only such intermetallic compounds but also carbides precipitate. The characteristics after a final heat treatment change with the precipitation form of the carbides.

Regarding the carbides in this type of Ni-base alloy, various different types of carbides precipitate depending on the type and amount of alloying elements, and representative carbides are $M_{23}C_6$ carbides and MC carbides, where M represents a metal element and C represents carbon.

Regarding a material (cast material) formed of a Ni-base alloy obtained by a conventional general casting method and a material (additive manufactured material) formed of a Ni-base alloy obtained by an additive manufacturing method, a metallographic structure before a heat treatment and a precipitation situation of carbides have been examined, and it has been confirmed that a solidification rate after melting of the powder with a laser or the like is much higher than a solidification rate in a case where the molten metal is solidified by the general casting method, and thus the crystal structure of the additive manufactured material is much finer than that of the cast material, and the grain size of the additive manufactured material is about several tens of μm while the grain size of the cast material is on the order of mm. In addition, in the cast material, coarse MC carbides are scattered around grain boundaries, and a certain level of grain boundary strength is obtained by $M_{23}C_6$ carbides precipitating at the grain boundaries by a subsequent heat treatment. In the additive manufactured material, solidification is performed much more rapidly than in the cast material, and thus MC carbides finely precipitate throughout the material including the inside of the crystal grains during solidification. Since the MC carbides are stable even at high temperatures, they are not solid-solubilized even after being heat-treated under the same conditions as in the case of the case material, and thus the MC carbides are finely dispersed and precipitated also inside the crystal grains. In a case where the MC carbides are not solid-solubilized as described above, the $M_{23}C_6$ carbides undergoing a subsequent solution treatment and an aging heat treatment are not sufficiently precipitated (mainly, precipitation at the grain boundaries), and thus they are combined and a sufficient grain boundary strength is not obtained. As a result, it has been found that high temperature creep characteristics of the additive manufactured material are inferior to those of the cast material, and particularly, a reduction in the notch high temperature creep life, that is, notch weakening, occurs.

Based on such recognition, it has been thought that in a case where a precipitation situation of carbides in the additive manufactured material, particularly, a precipitation situation of carbides by the heat treatment, is appropriately controlled, the grain boundaries of the additive manufactured material are strengthened, and the high temperature creep characteristics can thus be improved. As a result of various experiments and studies which have been repeatedly conducted, it has been found that in order to provide a material exhibiting notch strengthening by strengthening the grain boundaries of the additive manufactured material, one or more $M_{23}C_6$ carbides are necessary to be present on average at the grain boundaries per 10 μm of grain boundary length.

That is, in a case where a high temperature creep life (notch high temperature creep life) obtained using a notch test piece (notched test piece) in a high temperature creep rupture test is longer than a high temperature creep life (smooth high temperature creep life) obtained in a case where a smooth test piece having no notch is subjected to the high temperature creep rupture test, the high temperature creep characteristics, particularly, the high temperature notch creep characteristics, can be determined to be good (that is, a notch strengthening state), and thus in a case where a ratio of "notch high temperature creep life" divided by "smooth high temperature creep life" is defined as a creep life ratio, and the creep life ratio exceeds 1, it can be judged that notch strengthening characteristics are exhibited, and good high temperature creep characteristics, particularly, excellent notch high temperature creep characteristics, are obtained.

Accordingly, a heat treatment for carbide precipitation optimization is performed on the additive manufactured Ni-base alloy object before the solution heat treatment-aging heat treatment for precipitation of a γ' phase, and heat treatment conditions for the heat treatment for carbide precipitation optimization are variously changed to examine a relationship between a precipitation situation of intergranular precipitates mainly containing $M_{23}C_6$ carbides after the final solution heat treatment-aging heat treatment, particularly, the number of $M_{23}C_6$ carbides precipitated per unit grain boundary length at the grain boundaries and a creep life ratio obtained by a high temperature creep test at 760° C. As a result, as shown in FIG. 1, it has been found that in a case where the number of $M_{23}C_6$ carbides precipitated per unit grain boundary length is increased, the creep life ratio is increased, and particularly, in a case where the number of intergranular carbides formed of $M_{23}C_6$ carbides per 10 μm of grain boundary length is one or more on average, the creep life ratio exceeds 1.

Figure 2:
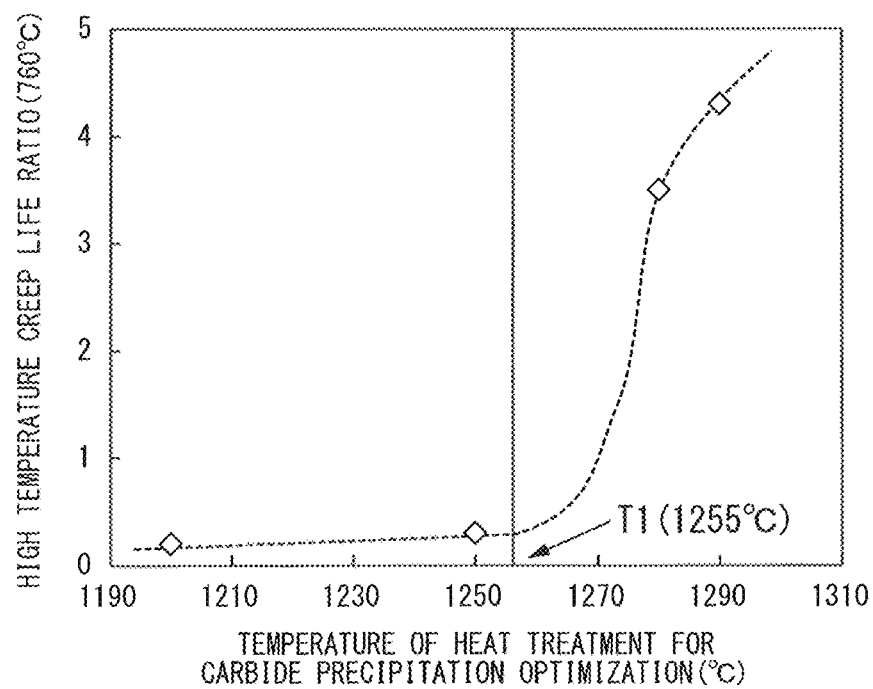
FIG. 2 is a graph showing a relationship between a temperature of a heat treatment for carbide precipitation optimization for the additive manufactured Ni-base object and a creep life ratio obtained by a high temperature creep test at 760° C.

It has further been found that in the above-described experiment, by appropriately setting the conditions for the heat treatment for carbide precipitation optimization before the additive manufactured Ni-base alloy object is subjected to the solution heat treatment-aging heat treatment for formation of a γ' phase, the precipitation situation (precipitation situation at the grain boundaries) of the $M_{23}C_6$ carbides is optimized, one or more $M_{23}C_6$ carbides are precipitated on average per 10 μm of grain boundary length, and thus a creep life ratio exceeding 1 can be secured. That is, the inventors of the invention have conducted a heat treatment for carbide precipitation optimization at various temperatures, and then performed a solution heat treatment and an aging heat treatment in the same manner as in a case of a conventional cast material to examine a relationship between the temperature of the heat treatment for carbide precipitation optimization and the creep life ratio, and found that, as shown in FIG. 2, in a case where the temperature of the heat treatment for carbide precipitation optimization is increased, the creep life ratio is increased, and particularly, in a case where the temperature of the heat treatment for carbide precipitation optimization is higher than a temperature T1 that is determined by Formula (1) according to a composition of the Ni-base alloy, the creep life ratio is rapidly increased, and a creep life ratio exceeding 1 can be secured. The temperature T1 of the Ni-base alloy used in the experiment, that is determined by Formula (1), is 1,255° C.

$$T1\ (°C.) = 177 \times Ni\ (\%) + 176 \times Co\ (\%) + 172 \times Cr\ (\%) + 178 \times Mo\ (\%) + 174 \times W\ (\%) + 171 \times Al\ (\%) + 170 \times Ti\ (\%) + 168 \times Ta\ (\%) + 163 \times Nb\ (\%) + 307 \times C\ (\%) - 16259 \quad (1)$$

Hereinafter, embodiments of a heat treatment method for an additive manufactured Ni-base alloy object, a method for manufacturing an additive manufactured Ni-base alloy object, a Ni-base alloy powder for an additive manufactured object, and an additive manufactured Ni-base alloy object according to the invention will be described in detail.

<Carbides in Additive Manufactured Object>

In a Ni-base alloy, $M_{23}C_6$ carbides and MC carbides mainly precipitate as described above.

In these carbides, M in the $M_{23}C_6$ carbide is mainly formed of Cr, Ni, and W. Such $M_{23}C_6$ carbides precipitate at grain boundaries by being subjected to a solution heat treatment and an aging heat treatment after formation of an additive manufactured object (after rapid solidification of the Ni-base alloy powder), and increase a grain boundary strength, thereby suppressing intergranular fracture during creep deformation, and exhibiting notch strengthening characteristics by an increase in the resistance to stress concentration. That is, a notch high temperature creep life is increased, and this contributes to an increase in the high temperature creep life ratio ("notch high temperature creep life" divided by "smooth high temperature creep life").

M in the MC carbides is mainly formed of Ti, Ta, and Nb. Such MC carbides precipitate during rapid solidification of the Ni-base alloy powder for additive manufacturing. As described above, the MC carbides sparsely precipitate as coarse precipitates during solidification in a conventional cast material including grain boundaries, but in an additive manufactured object, the MC carbides finely precipitate inside the crystal grains by melting and rapid solidification of the Ni-base alloy powder. In a case where the amount of MC carbides precipitating during the rapid solidification is too large in the additive manufactured object, a large amount of carbon is fixed, the amount of $M_{23}C_6$ carbides precipitating in the subsequent aging heat treatment is reduced, and as a result, the grain boundaries are not sufficiently strengthened.

Here, in order to reduce the amount of MC carbides precipitating during the rapid solidification, it is effective to reduce the amount of Ti, Ta, and Nb to be added, which are constituent elements of the MC carbides. However, since Ti, Ta, and Nb are also constituent elements of the γ' phase as a strengthening phase of the matrix, the above elements are necessarily added in a certain amount. Accordingly, in this embodiment, an appropriate heat treatment (heat treatment for carbide precipitation optimization) is performed before the solution heat treatment to decompose the MC carbides precipitating during the rapid solidification and to thus solid-solubilize carbon (C) in the matrix. By performing the heat treatment for carbide precipitation optimization as described above, the amount of $M_{26}C_6$ carbides precipitating at the grain boundaries due to a subsequent aging heat treatment is sufficiently secured.

Figure 3:
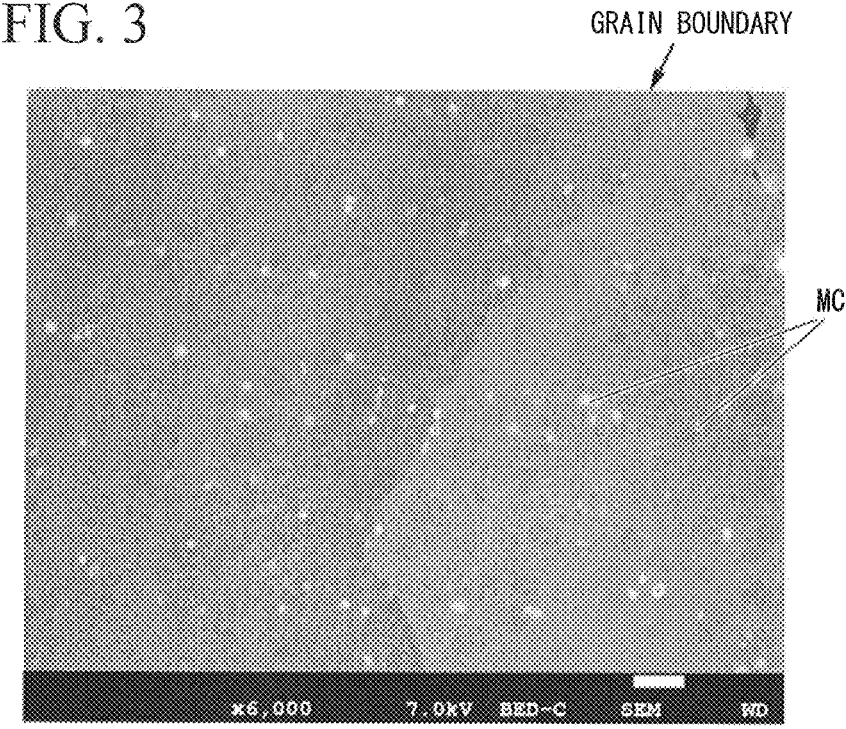
FIG. 3 is a metallographic cross-sectional structure photograph of the additive manufactured Ni-base object after an aging heat treatment in a case where a heat treatment for carbide precipitation optimization is not performed.

FIG. 3 shows a cross-sectional structure in the additive manufactured Ni-base alloy object in a case where the above-described heat treatment for carbide precipitation optimization is not performed. In this case, the MC carbides are finely dispersed and precipitated throughout the inside of the grains and the grain boundaries. The number of $M_{23}C_6$ carbides precipitated is small.

Figure 4:
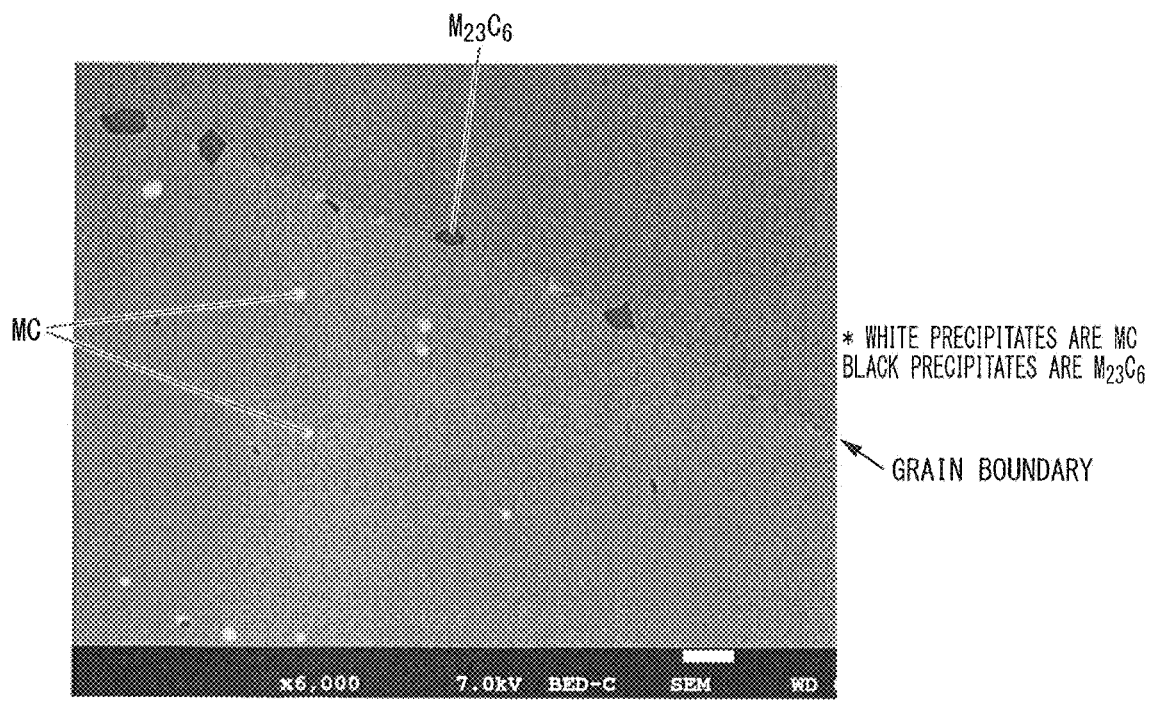
FIG. 4 is a metallographic cross-sectional structure photograph of the additive manufactured Ni-base object after the aging heat treatment in a case where the heat treatment for carbide precipitation optimization is performed.

FIG. 4 shows a cross-sectional structure in the additive manufactured Ni-base alloy object in a case where the heat treatment for carbide precipitation optimization is performed under appropriate conditions. In this case, it is found that $M_{23}C_6$ carbides precipitate at the grain boundaries, and MC carbides precipitate to some extent inside the grains.

In the additive manufactured Ni-base alloy object as an embodiment of the invention, one or more $M_{23}C_6$ carbides necessarily precipitate per 10 μm of grain boundary length as a condition for precipitation of $M_{23}C_6$ carbides after the aging heat treatment. Here, in a case where the number of $M_{23}C_6$ carbides precipitating per 10 μm of grain boundary length is less than 1, the grain boundaries are not sufficiently strengthened, and thus it is difficult to secure a high temperature creep life ratio exceeding 1 as described with reference to FIG. 1. In other words, it is difficult to exhibit notch strengthening characteristics.

<Composition of Ni-Base Alloy Powder>

In the embodiment of the invention, the composition of a Ni-base alloy powder for an additive manufactured object is determined from the viewpoint of securing a sufficient amount of $M_{23}C_6$ carbides precipitating due to an appropriate heat treatment for carbide precipitation optimization while securing the amount of the γ' phase precipitating as a strengthening phase of the matrix.

That is, basically, the Ni-base alloy powder for an additive manufactured object according to this embodiment contains, by mass %, Co: 15% to 25%, Cr: 10% to 25%, W: 0.5% to 10%, Al: 1.0% to 4.0%, Ti: 0% to 5.0%, Ta: 0% to 4.0%, Nb: 0% to 2.0%, C: 0.03% to 0.2%, B: 0.001% to 0.02%, Zr: 0% to 0.1%, and a balance consisting of Ni and unavoidable impurities, Al (%)+0.5×Ti (%) is within a range of 1% to 5%, and W (%)+0.5×Mo (%) is within a range of 0.5% to 10%.

In the Ni-base alloy powder for an additive manufactured object according to this embodiment, a total content of Ti, Ta, and Nb among the above components is preferably 10.0% or less.

In this embodiment, the reasons for limiting the composition of the Ni-base alloy powder are as follows.

[Co: 15% to 25%]

Co has an effect of increasing the limit (solid solution limit) of solid-solubilization of Ti, Al, and the like in the matrix at high temperatures. Accordingly, it not only acts to finely disperse and precipitate the γ' phase (compounds such as Ni, Ti, Al, and Ta) by a solution heat treatment-aging heat treatment, thereby improving the strength of the matrix, but also has an effect of promoting the solid-solubilization of MC carbides during a heat treatment for carbide precipitation optimization. Particularly, in order to obtain the latter of the above effects, 15% or greater of Co is needed. In a case where the Co content is greater than 25%, a harmful phase precipitates and embrittles, and a high-temperature strength decreases. Accordingly, the Co content is within a range of 15% to 22%. It is particularly desirable for the Co content to be within a range of 17% to 22%.

[Cr: 10% to 25%]

Cr is an element effective for improving the oxidation resistance at high temperatures. However, in a case where the content thereof is less than 10%, an improvement in the high-temperature oxidation resistance by addition of Cr is not sufficiently exhibited. Cr is a constituent element of a $M_{23}C_6$ carbide. In a case where the Cr amount is less than 10%, the amount of $M_{23}C_6$ carbides to be precipitated is reduced, and it becomes difficult to extend the high temperature creep life. It is not preferable for the Cr amount to be greater than 25% since a harmful phase precipitates, and thus the strength and the ductility are reduced. Accordingly, the Cr content is within a range of 10% to 25%. It is desirable for the Cr content to be within a range of 15% to 22% in the above range.

[W: 0.5% to 10%]

W is solid-solubilized into a γ phase as a matrix and has an effect of improving a strength by solid solution strengthening. W is a constituent element of a $M_{23}C_6$ carbide. However, since it is an element which slowly diffuses, it has an effect of suppressing the coarsening of the $M_{23}C_6$ carbide. In order to exhibit these effects, it is necessary to add 0.5% or greater of W. However, in a case where the W amount is greater than 10%, a harmful phase precipitates, and thus the strength and the ductility are reduced. Accordingly, the W content is within a range of 0.5% to 10%. It is particularly desirable for the W content to be within a range of 4% to 8% in the above range.

[Al: 1.0% to 4.0%]

Al is an element which generates a γ' phase, and has an effect of improving oxidation resistance and corrosion resistance at high temperature while increasing a high-temperature strength of the alloy, particularly, a high temperature creep strength by precipitation strengthening by the γ' phase precipitation grains. In a case where the Al amount is less than 1.0%, the amount of the γ' phase to be precipitated is reduced, and thus precipitation strengthening by the precipitates is not sufficiently achieved. In a case where the Al amount is greater than 4.0%, the weldability is reduced, and cracking frequently occurs during additive manufacturing. Accordingly, the Al content is within a range of 1.0% to 4.0%. Particularly, it is desirable for the Al content to be within a range of 1.5% to 3.5% in the above range.

[C: 0.03% to 0.2%]

C generates carbides represented by $M_{23}C_6$ carbides and MC carbides, and particularly, precipitates $M_{23}C_6$ carbides at grain boundaries by an appropriate heat treatment to provide grain boundary strengthening and notch strengthening. In a case where the C content is less than 0.03%, the amount of carbides is too small, and no strengthening effect can be expected. In a case where the C content is greater than 0.2%, the amount of MC carbides precipitating inside the crystal grains is large and the intragranular strength is too large compared to the grain boundary strength, and thus notch weakening is exhibited. Accordingly, the C content is within a range of 0.03% to 0.2%. It is particularly desirable for the C content to be within a range of 0.06% to 0.15% in the above range.

[B: 0.001% to 0.02%]

B strengthens the grain boundaries by being present at the grain boundaries, and is effective in improving a high temperature creep strength and notch weakening. In order to obtain these effects, it is necessary to add 0.001% or greater of B. In a case where the B amount is greater than 0.02%, there is a concern that a boride may be generated and the ductility may be reduced. Accordingly, the B content is within a range of 0.001% to 0.02%. It is particularly desirable for the B content to be within a range of 0.001% to 0.01% in the above range.

[Ti: 0% to 5.0%]

Ti is an element which generates a γ' phase, and has an effect of improving oxidation resistance and corrosion resistance at high temperature while increasing a high-temperature strength of the alloy, particularly, a high temperature creep strength by precipitation strengthening by the γ' phase precipitation grains. In a case where the Ti amount is greater than 5.0%, there is a concern that the weldability may be reduced, and cracking may frequently occur during additive manufacturing. Moreover, since the amount of MC carbides to be precipitated increases, carbon is fixed, and thus even in a case where a heat treatment for carbide precipitation optimization is performed, the amount of $M_{23}C_6$ carbides as intergranular precipitates to be precipitated is reduced. Accordingly, the Ti amount is required to be suppressed to 5.0% or less. Accordingly, the amount of Ti to be added is within a range of 0% to 5.0%. In a case where Ti is added, the Ti amount is preferably 0.01% or greater, and more preferably within a range of 1.0% to 4.0%.

[Al+0.5Ti: 1% to 5%]

In a case where Ti is added among Ti, Ta, and Nb, the amount of "Al+0.5Ti" is within a range of 1% to 5%. In a case where the amount of "Al+0.5Ti" is less than 1%, the amount of the γ' phase to be precipitated, which contributes to strengthening, is reduced, and thus there is a concern that the strength may be reduced. In a case where the amount of "Al+0.5Ti" is greater than 5.0%, the weldability is reduced, and cracking frequently occurs during additive manufacturing.

[Ta: 0% to 4.0%]

Ta is also an element which generates a γ' phase, and increases a high-temperature strength of the alloy, particularly, a high temperature creep strength by precipitation strengthening by the γ' phase precipitation grains. Ta is an element which generates stable MC carbides inside the crystal grains at high temperatures. In a case where 4.0% or greater of Ta is added, carbon is fixed, and thus even in a case where a heat treatment for carbide precipitation optimization is performed, $M_{23}C_6$ as intergranular precipitates is not generated, and notch weakening is exhibited. Accordingly, the amount of Ta is within a range of 0% to 4.0%. In a case where Ta is added, it is desirable for the Ta amount to be within a range of 0.01% to 3.0%.

[Nb: 0% to 2.0%]

Nb is also an element which generates a γ' phase, and increases a high-temperature strength of the alloy, particularly, a high temperature creep strength by precipitation strengthening by the γ' phase precipitation grains. Nb is an element which generates stable MC carbides inside the crystal grains at high temperatures. In a case where 2.0% or greater of Nb is added, carbon is fixed, and thus even in a case where a heat treatment for carbide precipitation optimization is performed, $M_{23}C_6$ carbides as intergranular precipitates are not generated. Accordingly, the amount of Nb to be added is within a range of 0% to 2.0%. In a case where Ta is added, it is desirable for the Ta amount to be within a range of 0.01% to 1.5% in the above range.

[Total Content of Ti, Ta, and Nb: 1.0% to 10.0%]

In a case where a total content of Ti, Ta, and Nb is less than 1.0%, the effect of increasing a high-temperature strength of the alloy, particularly, a high temperature creep strength by precipitation strengthening by the γ' phase precipitation grains, is not sufficiently exhibited. In a case where the total content of Ti, Ta, and Nb is greater than 10.0%, carbon is fixed, and as a result, even in a case where a heat treatment for carbide precipitation optimization is performed, there is a concern that $M_{23}C_6$ as intergranular precipitates may not be generated, and notch weakening may be exhibited. Accordingly, the total content of Ti, Ta, and Nb is 1.0% to 10.0%. The total content of Ti, Ta, and Nb is preferably within a range of 4.0% to 8.0% in the above range.

[Mo: 0% to 3.5%]

As similar to W, Mo is solid-solubilized into a γ phase as a matrix and has an effect of improving a strength by solid solution strengthening. In a case where the Mo amount is greater than 3.5%, a harmful phase precipitates, and thus the strength and the ductility are reduced. Accordingly, in a case where Mo is added, the amount of Mo to be added is within a range of 0% to 3.5%. In a case where Mo is added, it is particularly desirable for the Mo amount to be within a range of 0.01% to 2% in the above range.

[W+0.5Mo: 0.5% to 10%]

In a case where Mo is added together with W and the amount of "W+0.5Mo" is greater than 10%, a harmful phase precipitates, and thus the strength and the ductility are reduced. In a case where the amount of "W+0.5Mo" is less than 0.5%, the effect of improving the strength by solid solution strengthening by the addition of Mo and W is not sufficiently obtained. Accordingly, in a case where Mo is added together with W, the amount of "W+0.5Mo" is within a range of 0.5% to 10%.

[Zr: 0% to 0.1%]

Zr strengthens the grain boundaries by being present at the grain boundaries, and has an effect of improving a high temperature creep strength and notch weakening. In a case where the Zr amount is greater than 0.1%, there is a concern that the melting point of the grain boundary part may be locally reduced, and the strength may be reduced. Accordingly, the Zr amount is within a range of 0% to 0.1%. In a case where Zr is added, it is desirable for the Zr amount to be within a range of 0.01% to 0.04%.

The balance of the above elements consists of Ni and unavoidable impurities. In this type of Ni-base alloy, Fe, Si, Mn, Cu, P, S, N, and the like may be contained as unavoidable impurities, and it is desirable for the amount of each of Fe, Si, Mn, and Cu to be 0.5% or less, and for the amount of each of P, S, and N to be 0.01% or less.

<Grain Size of Ni-Base Alloy Powder for Additive Manufacturing>

The Ni-base alloy powder for an additive manufactured object according to the embodiment of the invention is made of the Ni-base alloy having the above-described composition, and an average grain size thereof is 100 μm or less. In a case where the average grain size is greater than 100 μm, it is difficult to lay the powder uniformly during additive manufacturing, and at the same time, the powder is not sufficiently melted. Accordingly, there is a concern that pores or joining defects such as non-deposition may be caused. The lower limit of the average grain size is not particularly defined, but preferably about 5 μm or greater in consideration of productivity of powder manufacturing and the like. In general, an average grain size of the Ni-base alloy powder for additive manufacturing is within a range of 10 to 45 μm.

<Heat Treatment Method and Method for Manufacturing Additive Manufactured Body>

Figure 5:
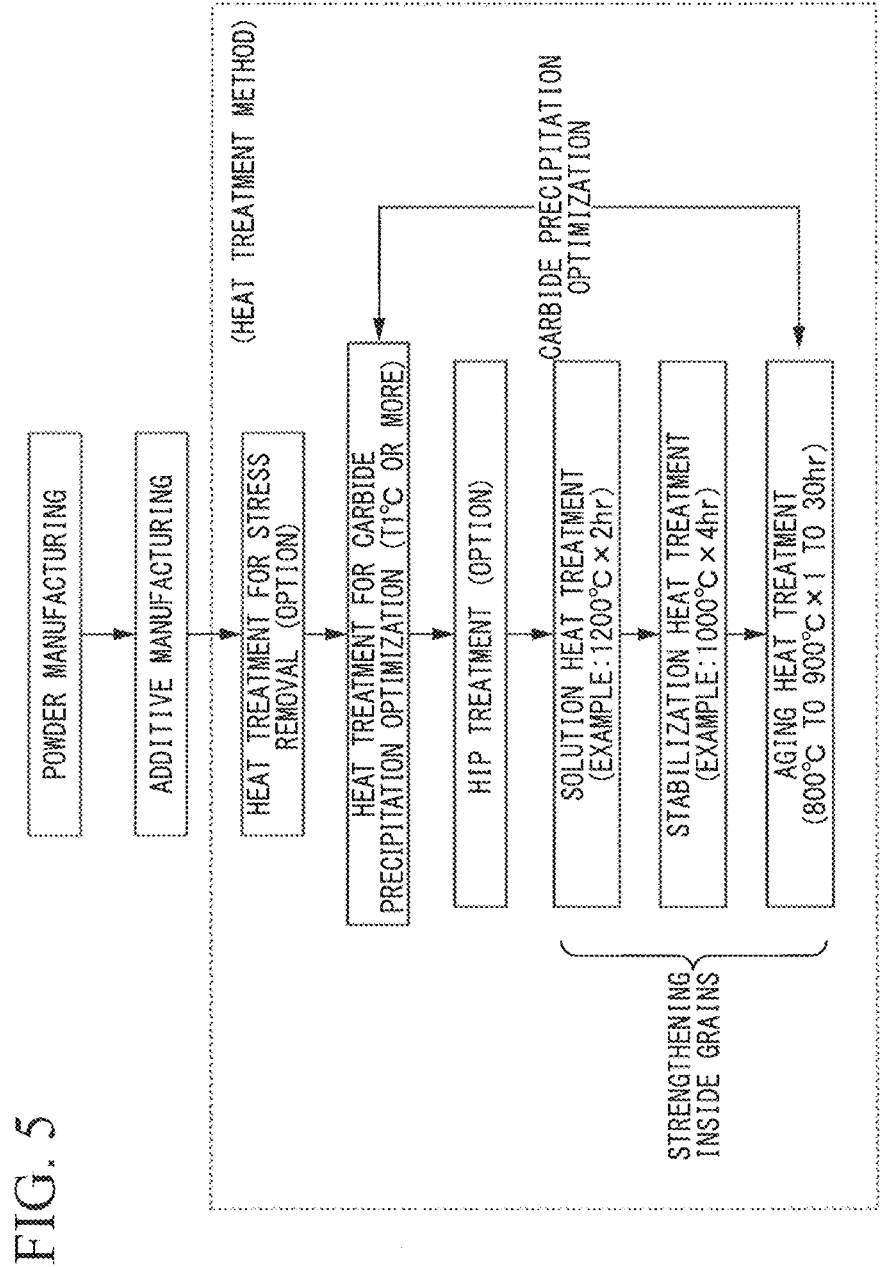
FIG. 5 is a flowchart showing an example of a method for manufacturing an additive manufactured object as an aspect of the invention, including an example of a heat treatment method.

FIG. 5 shows a flow of a method for manufacturing an additive manufactured body according to an embodiment of the invention. A flow of a heat treatment method according to an embodiment of the invention is included in the flow of the method for manufacturing an additive manufactured object shown in FIG. 5.

In the heat treatment method, a solution heat treatment-aging heat treatment is performed after additive manufacturing in order to precipitate a γ' phase which contributes to strengthening of the matrix, as in a general heat treatment method for a cast material of a Ni-base alloy member. In this embodiment, it is important to perform a heat treatment for carbide precipitation optimization under appropriate conditions before the solution heat treatment-aging heat treatment, that is, after optionally performing a heat treatment for stress removal on a shaped object obtained by additive manufacturing. That is, it is important for MC carbides precipitating due to rapid solidification during additive manufacturing to be decomposed and solid-solubilized by a heat treatment for carbide precipitation optimization, for a γ' phase to be precipitated in a subsequent aging heat treatment, and for $M_{23}C_6$ carbides to be sufficiently precipitated at grain boundaries.

In the heat treatment for carbide precipitation optimization, the heating temperature is equal to or higher than a temperature T1 determined by Formula (1) according to the composition of the Ni-base alloy.

That is, in a case where the temperature is lower than a certain temperature, MC carbides cannot be decomposed and solid-solubilized, and the minimum temperature T1 required for this differs depending on the composition of the Ni-base alloy. The inventors of the invention have conducted experiments on Ni-base alloys of various different compositions, and organized the results thereof by a multiple regression method. They found that in a case where a heat treatment for carbide precipitation optimization is performed in a temperature range of the temperature T1 or higher defined by Formula (1), a material in which $M_{23}C_6$ carbides are sufficiently precipitated (a material in which one or more $M_{23}C_6$ carbides are precipitated per 10 μm of grain boundary length), that is, a material having notch strengthening characteristics in which the above-described high temperature creep life ratio is greater than 1, is obtained as the material after an aging heat treatment.

$$T1\ (°C.) = 177 \times Ni\ (\%) + 176 \times Co\ (\%) + 172 \times Cr\ (\%) + 178 \times Mo\ (\%) + 174 \times W\ (\%) + 171 \times Al\ (\%) + 170 \times Ti\ (\%) + 168 \times Ta\ (\%) + 163 \times Nb\ (\%) + 307 \times C\ (\%) - 16259 \quad (1)$$

In Formula (1), the symbol % represents the mass % of each element. In the component elements described in Formula (1), in a case where there is a component not contained in the Ni-base alloy powder to be actually used, it is needless to say that the amount of the component is 0% in the calculation of Formula (1).

Hereinafter, the respective steps will be individually described.

[Powder Manufacturing Step]

The powder manufacturing step is a step of manufacturing a Ni-base alloy powder having an average grain size of 100 μm or less, which is made of an alloy of the above-described composition. Although a means for manufacturing the powder is not particularly limited, for example, a molten alloy of the above-described composition may be melted in the usual manner, and the molten alloy may be formed into a powder by, for example, a gas atomization method or the like. In some cases, sieving may be performed after manufacturing of the powder to obtain the above-described average grain size.

[Additive Manufacturing Step]

The additive manufacturing step may be performed by a known method. For example, a Ni-base alloy powder is dispersed on a base plate (substrate) made of a metal such as SUS316 to form a powder layer having a predetermined thickness, a region having a predetermined shape is irradiated with high-density energy such as a laser or electron beams by a computer program or the like to rapidly melt the powder in the region, the melt is rapidly solidified by heat extraction from the base plate side to form a rapidly solidified layer having a predetermined shape, an alloy powder is further dispersed on the rapidly solidified layer to form a second powder layer, the second powder layer in the predetermined region is melted by high-density energy such as a laser in the same manner as described above and rapidly solidified to form a second rapidly solidified layer, and the same process as the formation of the second rapidly solidified layer is repeated to form an additive manufactured object having a three-dimensional shape on the base plate.

In some cases, a thermal spraying method such as a plasma spraying method may be applied. In a state in which a Ni-base alloy powder is melted, droplets of the molten metal may be accumulated and rapidly solidified in a region having a predetermined shape on a substrate to form a rapidly solidified layer having a predetermined shape, a second rapidly solidified layer may be formed on the rapidly solidified layer by thermal spraying, and the same process may be repeated to form an additive manufactured object having a three-dimensional shape on the base plate.

After the formation of the additive manufactured object on the base plate, a heat treatment for stress removal of the next paragraph is optionally performed, and then the additive manufactured object is peeled off from the base plate by means such as cutting.

[Heat Treatment Step for Stress Removal (First Heat Treatment Step)]

In the additive manufacturing, residual stress usually occurs in a shaped object due to local rapid solidification. In that case, there is a concern that the shaped object may be deformed due to the residual stress after peeling of the additive manufactured object from the base plate. In that case, a heat treatment for stress removal is performed before the peeling. In a case where the deformation does not matter, the heat treatment is not necessarily performed. The conditions for the heat treatment for stress removal are not particularly limited, and in general, the heating is preferably performed for about 0.5 to 3 hours at a temperature of 1,000° C. to 1,200° C.

[Heat Treatment Step for Carbide Precipitation Optimization (Second Heat Treatment Step)]

The additive manufactured object optionally subjected to the heat treatment for stress removal is subjected to a heat treatment for carbide precipitation optimization. In the heat treatment for carbide precipitation optimization, the heating is performed for 1 hour or longer and 100 hours or shorter at a temperature not lower than T1 determined by Formula (1) according to the composition of the Ni-base alloy and not higher than 1,350° C.

Through the heating for one hour or longer at a temperature of T1 or higher, MC carbides can be decomposed, and the carbon (C) constituting the MC carbides can be solid-solubilized in the matrix. In a case where the heating temperature is lower than T1 or the heating time is shorter than 1 hour, separation and solid-solubilization of the MC carbides are not sufficiently performed. In a case where the heating temperature is higher than 1,350° C., the additive manufactured object is melted partially or completely, and thus it becomes difficult to maintain the shape thereof. In a case where the heating time is longer than 100 hours, the material characteristics are reduced due to the formation of a surface-altered layer.

[HIP Treatment Step (Third Heat Treatment Step)]

A HIP treatment is optionally performed after the heat treatment for carbide precipitation optimization. The HIP treatment is performed to eliminate the pores inside the additive manufactured object by isotropically applying a high pressure at high temperatures, thereby improving a high-temperature strength, and in general, the HIP treatment is performed under conditions in which a pressure of about 50 to 300 MPa is isotropically applied at 1,100° C. to 1,300° C.

[Solution Heat Treatment (Fourth Heat Treatment Step)]

A solution heat treatment (solution treatment) is performed after the HIP treatment is optionally performed. The solution heat treatment is performed to solid-solubilize the constituent elements of the γ' phase having an effect of increasing the matrix strength of the Ni-base alloy, and the heating is performed for 0.5 to 10 hours at a temperature of 1,150° C. to 1250° C. In a case where the heating temperature is lower than 1,150° C. or the heating time is shorter than 0.5 hours, the constituent elements of the γ' phase cannot be sufficiently solid-solubilized. In a case where the heating temperature is higher than 1,250° C. or the heating time is longer than 10 hours, there is a concern that the material characteristics may be reduced due to the formation of a surface-altered layer. Typically, the heating and holding is preferably performed for 2 hours at 1,200° C.

[Stabilization Heat Treatment Step (Sixth Heat Treatment Step)]

A stabilization heat treatment is optionally performed after the solution heat treatment. The stabilization heat treatment is a step of adjusting the form of the γ' phase by re-precipitating the constituent elements of the γ' phase solid-solubilized in the solution heat treatment, thereby exhibiting the strength improving effect by the γ' phase. In general, the heating and holding are only necessary to be performed for 0.5 to 10 hours at 950 to 1,150° C. Typically, the heating is performed for 4 hours at 1,000° C.

[Aging Heat Treatment Step (Seventh Heat Treatment Step)]

An aging heat treatment is performed after the stabilization heat treatment is optionally performed. The aging heat treatment is a necessary step for increasing the strength of the matrix by promoting the precipitation of the γ' phase, and increasing the grain boundary strength by precipitating $M_{23}C_6$ carbides on the grain boundaries, thereby imparting creep notch strengthening characteristics and improving the high temperature creep life ratio. In the aging heat treatment, the heating is performed for 1 to 30 hours at a temperature of 800° C. to 950° C. In a case where the heating temperature is lower than 800° C. or the heating time is shorter than 1 hour, the precipitation of the γ' phase and the grain boundary precipitation of the $M_{23}C_6$ carbides do not sufficiently proceed, and a predetermined aging effect is not obtained. In a case where the heating temperature is higher than 950° C. or the heating time is longer than 30 hours, the γ' phase coarsens, and the strength is reduced.

In the additive manufactured Ni-base alloy object obtained by the above method, one or more $M_{23}C_6$ carbides are precipitated on the grain boundaries per 10 μm of grain boundary length in a metallographic structure of a cross section of the additive manufactured Ni-base alloy object. Due to the $M_{23}C_6$ carbides, the grain boundaries are strengthened, and thus the notch strengthening characteristics are exhibited. Therefore, a high high-temperature creep life ratio can be exhibited. Accordingly, the additive manufactured Ni-base alloy object can endure long-term use at high temperatures without being ruptured early even in a case where it is used as a member such as a turbine which has a complicated shape and is used at high temperatures.

<Application to Turbine Member>

Basically, the additive manufactured Ni-base alloy object according to the invention can be suitably applied to all members requiring a high-temperature strength and creep characteristics, particularly, a high temperature creep strength. For example, the additive manufactured Ni-base alloy object according to the invention can exhibit excellent performance as a turbine member such as a turbine blade or a member for repairing a turbine member.

EXAMPLES

Examples of the invention will be described below together with comparative examples.

Example 1

Ni-base alloy powders (grain size: 10 to 45 μm) having the compositions shown in No. 1 to No. 15 of Table 1 were manufactured by a gas atomization method. Using the Ni-base alloy powder, an additive manufactured object was formed on a base plate made of SUS316 by a metal additive manufacturing apparatus (laser system, powder bed). Regarding additive manufacturing conditions, an additive manufactured object was formed such that an average thickness per solidified layer was 45 μm, 2,300 layers were laminated, and a maximum thickness was about 100 mm.

After the additive manufacturing, a heat treatment for stress removal (1,200° C.×2 hr) was performed, and the additive manufactured object was separated from the base plate. For the shaped objects (invention examples) obtained using the alloys Nos. 6 to 15, a heat treatment was performed for 2 hours at 1,290° C., that is equal to or higher than T1 of each alloy, as a heat treatment for carbide precipitation optimization. Thereafter, the heating was performed for 2 hours at 1,200° C. as a solution heat treatment, and then the heating was performed for 4 hours at 1,000° C. as a stabilization heat treatment, and the heating was further performed for 8 hours at 850° C. as an aging heat treatment. The shaped objects (comparative examples) obtained using the alloys Nos. 1 to 5 were not subjected to the above-described heat treatment for carbide precipitation optimization, but subjected to the solution heat treatment, the stabilization heat treatment, and the aging heat treatment under the same conditions as described above.

A round bar-like notch test piece (notched test piece) for a creep rupture test and a smooth test piece were cut out of each additive manufactured object after the aging heat treatment, and subjected to a high temperature creep rupture test at 760° C. according to the high temperature creep test method of JIS Z 2272.

The overall shape and the dimensions of a notch test piece (notched test piece) 1 are shown in FIG. 6, and the shape and the dimensions of a notch part 1B of a parallel part 1A are shown in FIG. 7. The shape and the dimensions of a smooth test piece 2 are shown in FIG. 8. Here, a diameter D of the bottom of the notch part 1A of the notch test piece 1 was made equal to a diameter D' of the parallel part 2A of the smooth test piece 2. The creep test was performed under uniaxial tensile stress with a load force of 490 MPa.

Along with the compositions of the alloy powders Nos. 1 to 15, temperatures T1 determined by Formula (1) according to the compositions are also shown in Table 1. Creep life ratios obtained by the above-described high temperature creep test at 760° C., that is, ratios (notch high temperature creep life/smooth high temperature creep life) of a high temperature creep life (notch high temperature creep life) determined by the notch test piece to a high temperature creep life (smooth high temperature creep life) in a case where the high temperature creep rupture test was performed on the smooth test piece having no notch, were examined, and the results thereof are shown in Table 1.

TABLE 1

| No. | Ni | Co | Cr | Mo | W | Al | Ti | Ta | Nb | C | B | Zr | Temperature T1 (° C.) | Number of $M_{23}C_6$ Carbides (per 10 μm of grain boundary length) | Creep Life Ratio | Remarks |
|---|---|---|---|---|---|---|---|---|---|---|---|---|---|---|---|---|
| No. 1 | Bal. | 20.9 | 19.6 | 0.4 | 6.4 | 0.5 | 2.1 | 2.1 | 1.2 | 0.14 | 0.001 | 0.02 | 1,264 | 0.2 | 0.1 | Comparative |
| No. 2 | Bal. | 18.5 | 16.6 | 0.1 | 7.3 | 3.2 | 1.7 | 1.9 | 3.2 | 0.09 | 0.007 | 0.02 | 1,232 | 0.3 | 0.2 | Examples |
| No. 3 | Bal. | 17.7 | 21.8 | 4.1 | 7.8 | 1.2 | 2.0 | 1.3 | 0.5 | 0.09 | 0.001 | 0.01 | 1,265 | 0.2 | 0.1 | |
| No. 4 | Bal. | 20.9 | 21.2 | 0.4 | 0.1 | 2.8 | 1.4 | 2.7 | 0.1 | 0.14 | 0.007 | 0.04 | 1,271 | 0.6 | 0.3 | |
| No. 5 | Bal. | 17.0 | 16.9 | 1.7 | 5.2 | 4.6 | 0.2 | 0.8 | 1.4 | 0.07 | 0.006 | 0.00 | 1,277 | 0.1 | 0.1 | |
| No. 6 | Bal. | 21.9 | 18.1 | 0.6 | 5.2 | 1.6 | 1.5 | 2.3 | 0.3 | 0.11 | 0.004 | 0.01 | 1,279 | 3.6 | 2.7 | Invention |
| No. 7 | Bal. | 17.8 | 21.1 | <0.01 | 4.9 | 2.1 | 1.0 | 2.0 | 1.0 | 0.08 | 0.003 | 0.02 | 1,258 | 3.2 | 3.2 | Examples |
| No. 8 | Bal. | 18.2 | 17.8 | 1.1 | 6.4 | 1.7 | 2.2 | 1.2 | 1.2 | 0.12 | 0.004 | 0.01 | 1,277 | 5.2 | 2.4 | |
| No. 9 | Bal. | 19.1 | 21.8 | 1.7 | 7.6 | 3.3 | <0.01 | 1.3 | <0.01 | 0.09 | 0.007 | 0.04 | 1,264 | 5.1 | 5.1 | |
| No. 10 | Bal. | 18.1 | 18.5 | <0.01 | 6.1 | 1.8 | 3.7 | 1.3 | 1.1 | 0.08 | 0.007 | 0.02 | 1,255 | 4.3 | 4.3 | |
| No. 11 | Bal. | 18.7 | 19.2 | <0.01 | 5.7 | 1.9 | 3.5 | 1.5 | 1.0 | 0.06 | 0.005 | 0.00 | 1,254 | 4.8 | 4.8 | |
| No. 12 | Bal. | 19.1 | 15.1 | 1.8 | 7.4 | 2.9 | 1.2 | 2.0 | 0.1 | 0.13 | 0.006 | 0.02 | 1,292 | 5.3 | 2.8 | |
| No. 13 | Bal. | 21.5 | 15.2 | <0.01 | 5.9 | 2.1 | 2.4 | 2.4 | 1.4 | 0.07 | 0.007 | 0.00 | 1,263 | 3.2 | 3.2 | |
| No. 14 | Bal. | 18.7 | 15.8 | 1.5 | 7.5 | 2.6 | 3.2 | 0.3 | 1.5 | 0.10 | 0.002 | 0.00 | 1,274 | 2.8 | 4.4 | |
| No. 15 | Bal. | 18.2 | 19.8 | 0.4 | 4.5 | 3.1 | 1.9 | <0.01 | <0.01 | 0.15 | <0.01 | 0.04 | 1,291 | 3.7 | 3.7 | |

In Invention Examples Nos. 6 to 15 subjected to the carbide precipitation optimization treatment at the temperature T1 or higher defined in the invention, the creep life ratio is 2 or greater, and it is obvious that the notch strengthening is exhibited.

In Comparative Examples Nos. 1 to 5 not subjected to the carbide precipitation optimization treatment at the temperature T1 or higher defined in the invention, the creep life ratio is less than 1, and it is obvious that the notch strengthening is not exhibited.

Example 2

The Ni-base alloy powder with the composition of No. 10 in Table 1 was used and additive manufactured as in Example 1, and the additive manufactured object obtained was subjected to a heat treatment for stress removal, a heat treatment for carbide precipitation optimization, a solution heat treatment, a stabilization heat treatment, and an aging heat treatment in this order. The temperature of the heat treatment for carbide precipitation optimization was variously changed. The conditions other than the temperature of the heat treatment for carbide precipitation optimization are the same as in Example 1.

The additive manufactured object after the aging heat treatment was subjected to a high temperature creep rupture test at 760° C. as in Example 1 to examine a high temperature creep life ratio (notch high temperature creep life/smooth high temperature creep life), and the results thereof are shown in Table 2.

TABLE 2

| | Components (mass %) | | | | | | | | | | | Temperature T1 | Temperature of Heat Treatment for Carbide Precipitation Optimization | |
|---|---|---|---|---|---|---|---|---|---|---|---|---|---|---|
| No. | Ni | Co | Cr | Mo | W | Al | Ti | Ta | Nb | C | B | Zr | (° C.) | (° C.) | Creep Life Ratio |
| No. 10 | Bal. | 18.1 | 18.5 | <0.01 | 6.1 | 1.8 | 3.7 | 1.3 | 1.1 | 0.08 | 0.007 | 0.02 | 1,255 | 1,200 | 0.2 |
| | | | | | | | | | | | | | | 1,250 | 0.3 |
| | | | | | | | | | | | | | | 1,280 | 3.5 |
| | | | | | | | | | | | | | | 1,290 | 4.3 |

From Table 2, it is seen that in a case where the temperature of the heat treatment for carbide precipitation optimization is equal to or higher than the temperature T1 (1,255° C.) of the alloy No. 10, a high creep life ratio is obtained, and thus notch strengthening is achieved.

Although the preferable embodiments and examples of the invention have been described above, these embodiments and examples are merely examples within the scope of the gist of the invention, and addition of configurations, omissions, substitutions, and other changes can be made without departing from the scope of the gist of the invention. That is, the invention is not limited by the above description, and is limited only by the appended claims, and it is needless to say that the invention can be appropriately changed within the scope.

INDUSTRIAL APPLICABILITY

According to a heat treatment method for obtaining an additive manufactured Ni-base object, a method for manufacturing an additive manufactured Ni-base alloy object, a Ni-base alloy powder for an additive manufactured object, and an additive manufactured Ni-base alloy object of the invention, it is possible to improve a notch high temperature creep life.

REFERENCE SIGNS LIST

1: notch test piece
2: smooth test piece

The invention claimed is:

1. A heat treatment method for an additive manufactured Ni-base alloy object, the method comprising:
a providing step of providing an additive manufactured object formed of a Ni-base alloy laminate-molded into a predetermined shape, a heat treatment step for carbide precipitation optimization of heating the additive manufactured object for 0.5 hours or longer and 100 hours or shorter at a temperature which has a lower limit T1 that is equal to or higher than 1,255° C. and upper limit that is equal to or lower than 1,350° C.; and
an aging heat treatment step of heating the additive manufactured object for 1 to 30 hours at a temperature of 800° C. to 950° C. after the heat treatment step for carbide precipitation optimization,
wherein the lower limit T1 is determined by Formula (1):

$$T1\ (°\ C.) = 177 \times Ni\ (\%) + 176 \times Co\ (\%) + 172 \times Cr\ (\%) + 178 \times Mo\ (\%) + 174 \times W\ (\%) + 171 \times Al\ (\%) + 170 \times Ti\ (\%) + 168 \times Ta\ (\%) + 163 \times Nb\ (\%) + 307 \times C\ (\%) - 16259 \quad (1),$$

and
wherein the Ni-base alloy contains, by mass %,
Co: 15% to 25%,
Cr: 10% to 22%,
Mo: 0% to 3.5%,
W: 0.5% to 10%,
Al: 1.0% to 4.0%,
Ti: 0% to 5.0%,
Ta: 0% to 4.0%,
Nb: 0% to 2.0%,
C: 0.03% to 0.2%,
B: 0.001% to 0.02%,
Zr: 0% to 0.1%, and
a balance consisting of Ni and unavoidable impurities.

2. The heat treatment method for an additive manufactured Ni-base alloy object according to claim 1,
wherein the Ni-base alloy contains, by mass %,
Al (%)+0.5×Ti (%) of 1% to 5%, and
W (%)+0.5×Mo (%) of 0.5% to 10%.

3. The heat treatment method for an additive manufactured Ni-base alloy object according to claim 1,
wherein a total content of Ti, Ta, and Nb in the Ni-base alloy is 10.0% or less by mass %.

4. The heat treatment method for an additive manufactured Ni-base alloy object according to claim 1, further comprising:
a solution heat treatment step of heating the additive manufactured object for 0.5 to 10 hours at a temperature of 1,150° C. to 1,250° C. between the heat treatment step for carbide precipitation optimization and the aging heat treatment step.

5. The heat treatment method for an additive manufactured Ni-base alloy object according to claim 1,
wherein a heat treatment for stress removal is performed on the additive manufactured object before the heat treatment step for carbide precipitation optimization.

6. The heat treatment method for an additive manufactured Ni-base alloy object according to claim 1,
wherein a HIP treatment is performed on the additive manufactured object after the heat treatment step for carbide precipitation optimization and before the aging heat treatment step.

7. The heat treatment method for an additive manufactured Ni-base alloy object according to claim 1,
wherein a stabilization heat treatment is performed after the heat treatment step for carbide precipitation optimization and before the aging heat treatment step.

8. A heat treatment method for an additive manufactured Ni-base alloy object,
comprising carrying out the heat treatment method for an additive manufactured Ni-base alloy object according to claim 1 to precipitate one or more $M_{23}C_6$ carbides on average at grain boundaries per 10 μm of grain boundary length.

9. A method for manufacturing an additive manufactured Ni-base alloy object, the method comprising:
an additive manufacturing step of forming an additive manufactured object formed of a Ni-base alloy on a substrate by repeating a process of melting a Ni-base alloy powder and forming a rapidly solidified layer on the substrate; and
subsequently subjecting the additive manufactured object to the heat treatment method for an additive manufactured Ni-base alloy object according to claim 1.

* * * * *